US011225899B2

(12) United States Patent
Rodriguez et al.

(10) Patent No.: US 11,225,899 B2
(45) Date of Patent: Jan. 18, 2022

(54) SUPPLEMENTAL ENGINE BRAKING SYSTEM

(71) Applicant: Cummins Inc., Columbus, IN (US)

(72) Inventors: Stephen E. Rodriguez, Columbus, IN (US); Steven M. Bellinger, Columbus, IN (US); Gregory E. Smith, Elletsville, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/803,687

(22) Filed: Feb. 27, 2020

(65) Prior Publication Data

US 2020/0277886 A1 Sep. 3, 2020

Related U.S. Application Data

(60) Provisional application No. 62/811,858, filed on Feb. 28, 2019.

(51) Int. Cl.

| | |
|---|---|
| ***F01P 7/08*** | (2006.01) |
| ***B60W 10/06*** | (2006.01) |
| ***F02D 41/12*** | (2006.01) |

(52) U.S. Cl.

CPC ................ *F01P 7/08* (2013.01); *F02D 41/12* (2013.01); *F01P 2025/00* (2013.01); *F02D 2200/025* (2013.01); *F02D 2200/501* (2013.01); *F02D 2200/702* (2013.01)

(58) Field of Classification Search

CPC ........... B60W 10/06; B60W 30/18127; B60W 30/18136; B60W 30/18109

See application file for complete search history.

(56) References Cited

U.S. PATENT DOCUMENTS

| | | | | |
|---|---|---|---|---|
| 5,445,128 | A * | 8/1995 | Letang | F02D 31/009 123/436 |
| 6,067,489 | A * | 5/2000 | Letang | F01P 7/04 123/299 |
| 2007/0261648 | A1* | 11/2007 | Reckels | F01P 7/167 123/41.12 |
| 2007/0272173 | A1* | 11/2007 | Reckels | F01P 7/167 123/41.11 |
| 2010/0082205 | A1* | 4/2010 | Sabelstrom | F16D 65/78 701/48 |
| 2011/0132292 | A1* | 6/2011 | Schwartz | F01P 7/048 123/41.12 |
| 2012/0304636 | A1* | 12/2012 | Nelson | F15B 7/005 60/459 |
| 2015/0207359 | A1* | 7/2015 | Ok | H02J 7/14 320/101 |
| 2017/0163181 | A1* | 6/2017 | Namuduri | H02P 6/14 |
| 2018/0265086 | A1* | 9/2018 | Nakamura | B60W 10/02 |
| 2018/0354493 | A1* | 12/2018 | Johri | B60W 30/18027 |

* cited by examiner

*Primary Examiner* — Long T Tran
(74) *Attorney, Agent, or Firm* — Foley & Lardner LLP

(57) ABSTRACT

Systems and apparatuses include method of controlling a fan to supplement engine braking, including determining that an engagement condition for the fan exists, interpreting an operating parameter of the fan, determining a modified operating parameter for the fan based on a predefined limit, operating the fan according to the modified operating parameter, and ceasing operation of the fan according to the modified operating parameter when a disengagement condition for the fan exists.

18 Claims, 2 Drawing Sheets

SUPPLEMENTAL ENGINE BRAKING SYSTEM

CROSS REFERENCE TO RELATED APPLICATION

This application claims the benefit of and priority to U.S. Provisional Patent Application No. 62/811,858, filed on Feb. 28, 2019, which is incorporated herein by reference in its entirety.

TECHNICAL FIELD

The present disclosure relates to engine braking systems. More particularly, the present disclosure relates to systems and methods for providing supplemental engine braking by engaging an engine accessory such as a fan.

BACKGROUND

Engine braking is often used to slow a travel rate of a vehicle. Engine braking involves using retarding forces within an engine to reduce the engines output to a drivetrain or propulsion system.

SUMMARY

One embodiment relates to systems and methods for controlling an engine accessory and/or a vehicle accessory to supplement engine retarding power. In some embodiments, an engine cooling fan is controlled during grade descents. In some embodiments, a hydraulic pump, an air compressor, an alternator, and/or traction motors may be controlled. In some embodiments, still other components may be controlled to supplement engine retarding power.

In some embodiments, a method of controlling a fan to supplement engine braking includes determining that an engagement condition for the fan exists, interpreting an operating parameter of the fan, determining a modified operating parameter for the fan based on a predefined limit, operating the fan according to the modified operating parameter, and ceasing operation of the fan according to the modified operating parameter when a disengagement condition for the fan exists.

In some embodiments, an apparatus includes a circuit structured to: determine that an engagement condition for an engine accessory exists, determine a target vehicle speed, determine a modified operating parameter for the engine accessory to bias a vehicle speed toward the target vehicle speed, operate the engine accessory according to the modified operating parameter, and cease operation of the engine accessory according to the modified operating parameter when a disengagement condition for the engine accessory exists.

In some embodiments, a system includes a fan, and a controller coupled to the fan and structured to: determine that an engine brake is engaged, determine a target vehicle speed, determine an initial fan speed to supplement the engine brake and bias a vehicle speed toward the target vehicle speed, determine a modified operating parameter for the fan based at least in part on the initial fan speed and on a predefined limit, deliver modified operating parameter to the fan, and cease operation of the fan according to the modified operating parameter when a disengagement condition for the engine accessory exists.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of, methods, apparatuses, and systems for supplementing an engine braking system. The various concepts introduced above and discussed in greater detail below may be implemented in any number of ways, as the concepts described are not limited to any particular manner of implementation. Examples of specific implementations and applications are provided primarily for illustrative purposes.

Referring to the figures generally, the various embodiments disclosed herein relate to systems, apparatuses, and methods for operating an accessory of an engine (e.g., the fan) to supplement engine braking power. An accessory controller operates the accessory to reduce noise and address other factors (e.g., fan speed, speed ratios, etc.) leading to an improved user experience and an increase in accessory lifespan.

Figure 1:
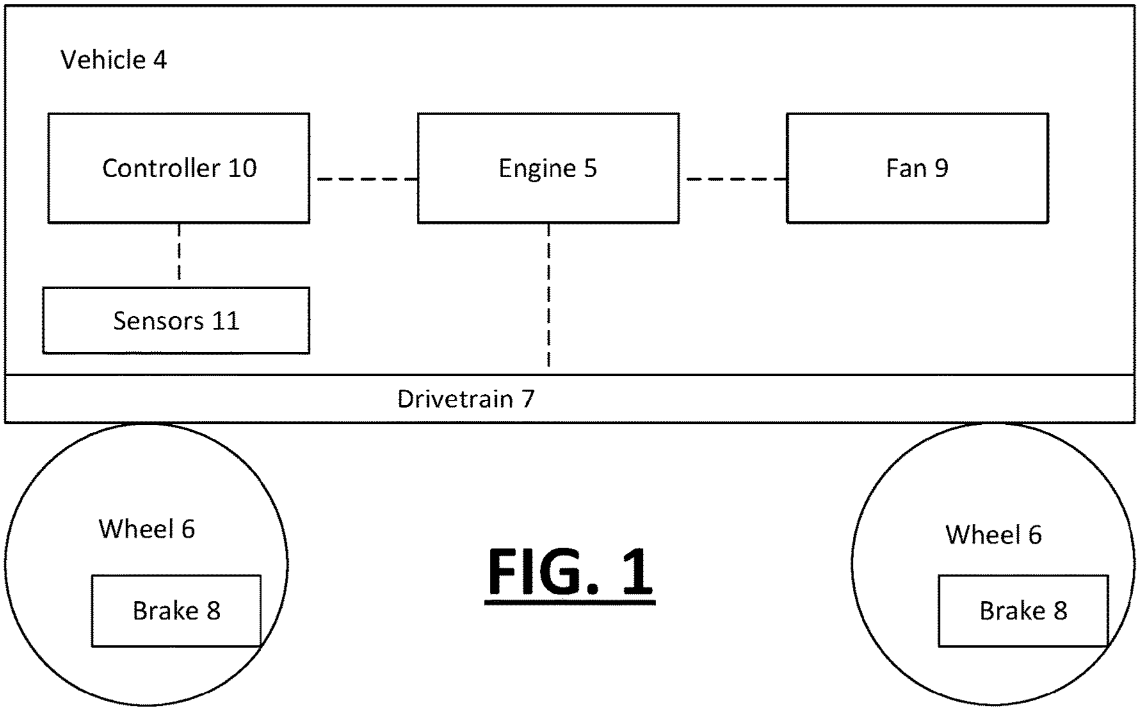
FIG. 1 is a schematic representation of a vehicle according to some embodiments.

As shown in FIG. 1, the system includes a vehicle 4, an engine 5 mounted within the vehicle that provides power to vehicle systems (e.g., propulsive power to wheels 6), a drivetrain 7, a braking system 8, an engine accessory (e.g., a fan and fan motor 9, a hydraulic pump, an air compressor, an alternator, a traction motor, etc.), and a controller 10 coupled with sensors 11 positioned to observe vehicle parameters. The vehicle 4 may be an on-road or an off-road vehicle including, but not limited to, line-haul trucks, sedans, etc. The engine 5 may be a spark-ignition engine, a compression-ignition engine, and/or any other type of engine.

The controller 10 is structured to control operation of the engine accessory (e.g., the fan 9) in response to determined and/or received information from sensors indicative of vehicle parameters to supplement engine braking power while providing a secondary benefit (e.g., reducing noise, increasing accessory lifespan, etc.). In some embodiments, engine braking power is supplemented during grade descents.

As the components of FIG. 1 are shown to be embodied in the vehicle 4, the controller 10 may be structured as one or more electronic control units (ECU). The controller 10 may be separate from or included with at least one of a transmission control unit, an exhaust aftertreatment control unit, a powertrain control module, an engine control module, etc. The function and structure of the controller 10 is described in greater detail in FIG. 2.

Figure 2:
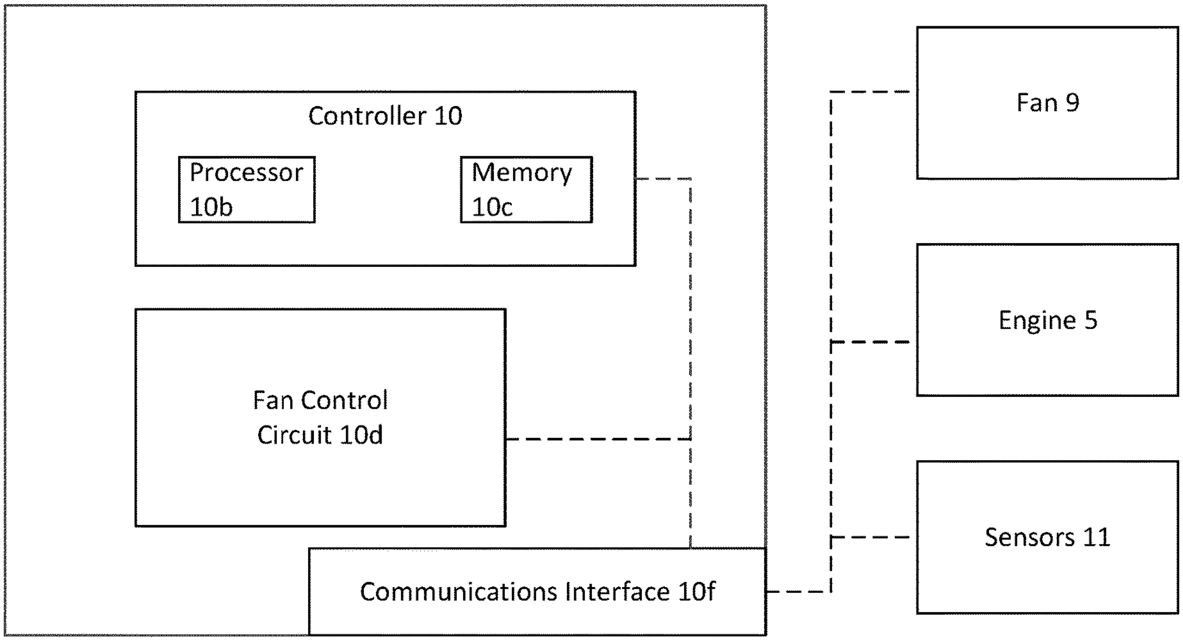
FIG. 2 is a schematic diagram of a controller of the vehicle of FIG. 1 according to some embodiments.

Referring now to FIG. 2, a schematic diagram of the controller 10 of the vehicle 4 of FIG. 1 is shown according to an example embodiment. As shown in FIG. 2, the controller 10 includes a processing circuit **10*a* having a processor 10*b* and a memory device 10*c*, a fan control circuit 10*d*, and a communications interface 10*f***.

In one configuration, the fan control circuit 10*d* is embodied as machine or computer-readable media that is executable by a processor, such as processor 10*b*. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the fan control circuit 10*d* is embodied as one or more hardware units, such as electronic control units. As such, the fan control circuit 10*d* may be embodied as one or more circuitry components including, but not limited to, processing circuitry, network interfaces, peripheral devices, input devices, output devices, sensors, etc. In some embodiments, the fan control circuit 10*d* may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the fan control circuit 10*d* may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The fan control circuit 10*d* may also include programmable hardware devices such as field programmable gate arrays, programmable array logic, programmable logic devices or the like. The fan control circuit 10*d* may include one or more memory devices for storing instructions that are executable by the processor(s) of the fan control circuit 10*d*. The one or more memory devices and processor(s) may have the same definition as provided below with respect to the memory device 10*c* and processor 10*b*. In some hardware unit configurations, the fan control circuit 10*d* may be geographically dispersed throughout separate locations in the vehicle. Alternatively and as shown, the fan control circuit 10*d* may be embodied in or within a single unit/housing, which is shown as the controller 10.

In the example shown, the controller 10 includes a processing circuit 10*a* having a processor 10*b* and a memory device 10*c*. The processing circuit 10*a* may be structured or configured to execute or implement the instructions, commands, and/or control processes described herein with respect to fan control circuit 10*d*. The depicted configuration represents the fan control circuit 10*d* as machine or computer-readable media. However, as mentioned above, this illustration is not meant to be limiting as the present disclosure contemplates other embodiments where the fan control circuit 10*d*, or at least one circuit of the fan control circuit 10*d*, is configured as a hardware unit. All such combinations and variations are intended to fall within the scope of the present disclosure.

The processor 10*b* may be implemented as one or more general-purpose processor, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., fan control circuit 10*d* may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory device 10*c* (e.g., RAM, ROM, Flash Memory, hard disk storage, etc.) may store data and/or computer code for facilitating the various processes described herein. The memory device 10*c* may be communicably connected to the processor 10*b* to provide computer code or instructions to the processor 10*b* for executing at least some of the processes described herein. Moreover, the memory device 10*c* may be or include tangible, non-transient volatile memory or non-volatile memory. Accordingly, the memory device 10*c* may include database components, object code components, script components, or any other type of information structure for supporting the various activities and information structures described herein.

The fan control circuit 10*d* is structured to receive information from the sensors 11 and control the fan 9. In some embodiments, the fan control circuit 10*d* is structured as a control circuit for another engine accessory. The fan control circuit 10*d* is structured to operate the fan 9 during normal operation, and additionally, the fan control circuit 10*d* is structured to control the fan 9 (or another engine accessory) according to the following method.

Figure 3:
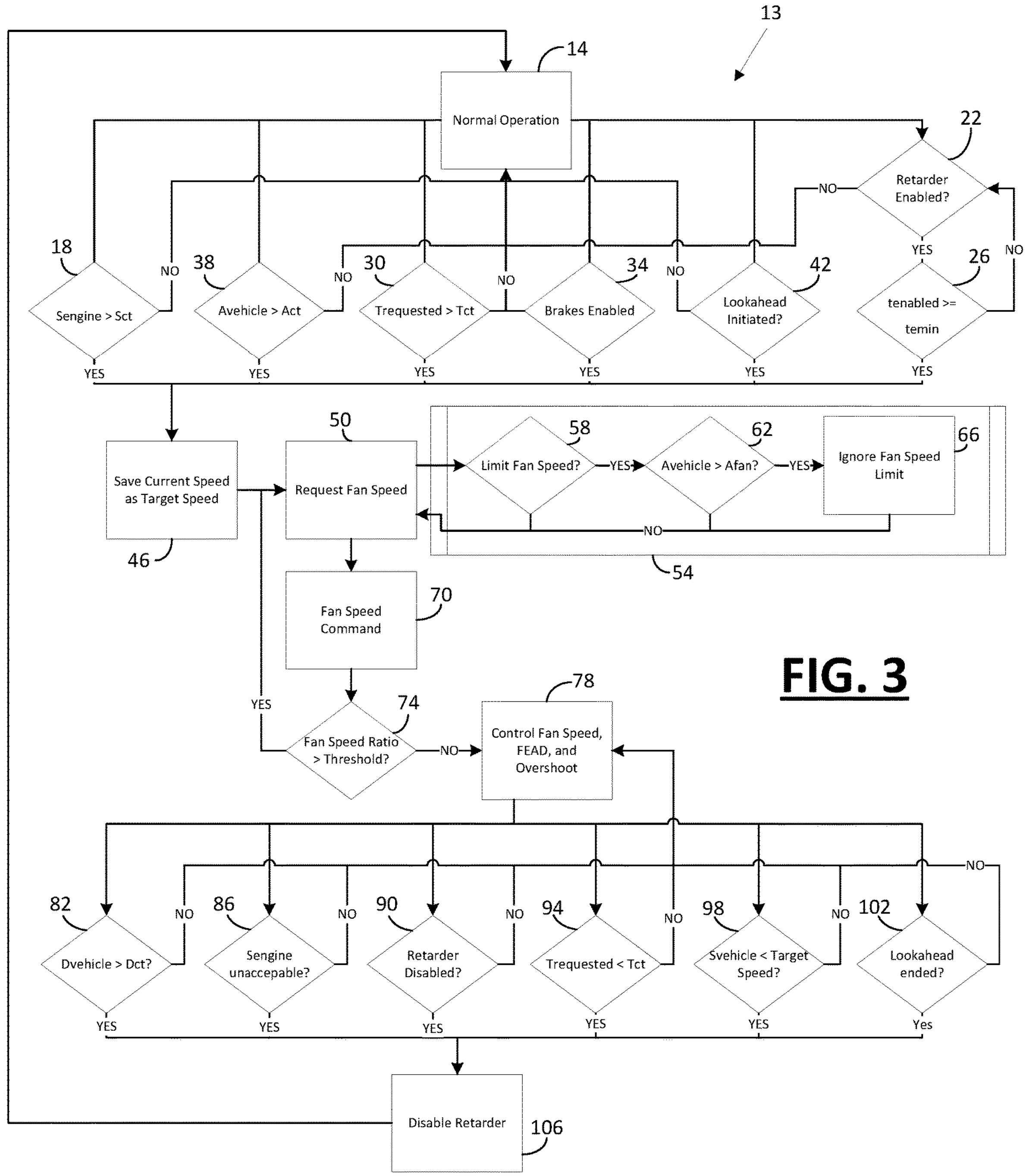
FIG. 3 is a flowchart showing an exemplary operation of a system for supplementing engine braking, according to some embodiments.

As shown in FIG. 3, a method 13 includes providing power to the drivetrain from the engine to propel the vehicle. Operation without engine braking occurs continually at step 14 until the system determines the need to supplement engine retarding power. In some embodiments, a supplemental engine retarding power is provided when a combination of the following conditions are met.

Various thresholds and conditions are discussed within the following description of the method 13. For example, thresholds and conditions can include an engine speed calibrated threshold ($S_{CT}$), a minimum duration of time ($t_{emin}$), a torque calibratable threshold ($T_{CT}$), brake engagement, an acceleration calibratable threshold ($A_{CT}$), an acceleration threshold ($A_{fan}$), and a calibratable fan speed ratio. Other thresholds and conditions are contemplated within the scope of the method 13. The thresholds and conditions are used by the controller 10 to determine when supplemental engine braking is or may be needed and/or desirable. For example, supplemental engine braking may be desirable when the vehicle 4 is entering a descent on an incline of acceptable pitch and acceptable length, a combination of vehicle parameters may exceed or otherwise satisfy thresholds and conditions to indicate that supplemental engine braking is appropriate or desired. The below description provides additional examples of how thresholds and conditions can be used by the controller 10 to implement the method 13.

At step 18, the controller 10 compares an engine speed ($S_{engine}$) to an engine speed calibratable threshold ($S_{CT}$). If the engine speed ($S_{engine}$) is greater than or equal to the engine speed calibratable threshold ($S_{CT}$), then the condition of step 18 is met.

At step 22, the controller 10 determines if an engine retarder (e.g., an exhaust throttle, a variable geometry turbocharger (VGT), a compression brake, etc.) is enabled. If the engine retarder is engaged, the controller 10 then compares a time that the engine retarder has been engaged ($t_{engaged}$) to a minimum duration of time ($t_{emin}$) at step 26. If the time that the engine retarder has been engaged ($t_{engaged}$) is greater than or equal to the minimum duration of time ($t_{emin}$), then the condition of step 26 is met.

At step 30, the controller 10 compares an engine retarder torque request ($T_{requested}$) to a torque calibratable threshold ($T_{CT}$). If the engine retarder torque request ($T_{requested}$) is greater than or equal to the torque calibratable threshold ($T_{CT}$) then the condition of step 26 is met. In some embodiments, the torque calibratable threshold ($T_{CT}$) could include a low setting, a medium setting, and a high setting or include a percent of full retarder torque capability.

At step 34, the controller determines if the vehicle service/foundation brakes (e.g., friction brakes 8 at the wheels 6) are in use or engaged. If the brakes 8 are in use, then the condition of 34 is met.

At step 38, the controller 10 compares a vehicle acceleration ($A_{vehicle}$) to an acceleration calibratable threshold ($A_{CT}$). If the vehicle acceleration ($A_{vehicle}$) is greater than or equal to the acceleration calibratable threshold ($A_{CT}$), then the condition of step 38 is met.

At step 42, the controller 10 queries a look-ahead system that may include map data, satellite data, gps data, an eHorizon system, a vehicle-to-vehicle or vehicle-to-X communication system, or another system. The query may include samples of a projected route of the vehicle or may be a query regarding a set distance from the vehicle (e.g., 1,000 feet). Information received from the look-ahead system can include upcoming pitch and/or length of downhill grade and can be used to enable or disable use of the engine accessory (e.g., the fan 9).

Steps 18-42 include exemplary engagement conditions that can be used by the controller 10 to initiate and start (or alter the operation of) an engine accessory in the form of a fan 9 to add to or supplement the engine braking capabilities of the engine 5. In some embodiments, the engagement condition includes only one of the steps 18-42. In some embodiments, the engagement condition includes a combination of the steps 18-42. In some embodiments, different combinations of steps 18-42 being met may result in the engagement condition being met. For example, if the look-ahead system determines a large downhill section upcoming at step 42, and the brakes are enabled at step 34, then the engagement condition is met, even if the conditions of other steps are not met. In some embodiments, all the conditions of steps 18-42 must be met in order for the engagement condition to be met.

Once the engagement condition is satisfied, the fan 9 is engaged to supplement the engine braking capability. At step 46, the current vehicle speed will be stored as a target speed. At step 50, the controller 10 requests an operating parameter of the engine accessory (e.g., the fan 9) in the form of a fan speed that may be a combination of the following: a constant, a function of the engine speed or a fan hub speed, and/or a function of a power needed to return to the target vehicle speed with hysteresis (e.g., to allow for closed loop fan control as a function of vehicle speed). In some embodiments, the controller 10 determines the operation parameter (e.g., initial fan speed). Determination may include requesting the operational parameter from a database, a lookup table, a fan module or circuit, or determining the operational parameter independently based on sensor and other information.

A subprocess 54 is included in step 50 and includes a determination at step 58 of whether the controller 10 should limit the operating parameter (e.g., the fan speed). The speed requested at step 50 may be limited to accommodate vehicle noise goals or limits and fan durability requirements such as fan slip heat limits and max fan speed. Engine durability factors such as intake and coolant temperatures can also be used as factors in the determination of the fan speed at step 58. The controller 10 may determine that a modified speed is warranted and determines a modified operating parameter (e.g., a modified fan speed) for operating the fan 9 at a different speed.

At step 62, the controller 10 compares a vehicle acceleration ($A_{vehicle}$) to an acceleration threshold ($A_{fan}$). If the vehicle acceleration ($A_{vehicle}$) is greater than or equal to the acceleration threshold ($A_{fan}$), some of the aforementioned fan speed limits may be ignored at step 66. For example, if the vehicle acceleration ($A_{vehicle}$) exceeds the acceleration threshold ($A_{fan}$) the fan can be run at a maximum fan speed until the vehicle acceleration ($A_{vehicle}$) drops below the acceleration threshold ($A_{fan}$). In other words, the modified operating parameter may be a function of the vehicle acceleration or may be affected by the vehicle acceleration. If the fan speed is ignored at step 66, the modified fan speed is integrated into a fan speed command at step 70. If the fan speed is not ignored or otherwise modified, then the speed request formed in step 50 can be used unmodified to determine the fan speed command at step 70.

The controller 10 then provides the modified fan speed to the fan at step 70 and the fan 9 is operated to supplement the engine braking capability.

At step 74, the controller 10 monitors a fan speed ratio (i.e., the fan speed to the fan drive speed) and compares the fan speed ratio to a calibratable fan speed ratio threshold. If the fan speed ratio is greater than or equal to the calibratable fan speed ratio threshold, the method 13 returns to step 50 and the modified fan speed is updated.

If the fan speed ratio is not greater than or equal to the calibratable fan speed ratio threshold at step 74, then the method 13 proceeds to step 78 and the fan speed command rate of change may be limited or filtered in order to control undesirable front end accessory drive (FEAD) behavior (e.g., belt slip, etc.) and limit noise impacts. This limiting may be variable as a function of engine speed or engine acceleration. It should be noted that the monitoring done at step 74 is ongoing and the modified fan speed can be updated at step 50 and 78 on an ongoing basis. Additionally, at step 78 the controller 10 will reset any integral terms in the controller 10 whenever duty cycle commands are saturated, and the controller will actively engage to avoid overshooting the imposed upper limits for the fan speed.

Operation of the engine accessory (e.g., the fan 9) as a supplemental engine braking system continues until a disengagement condition is met. In some embodiments, the disengagement condition is met when a combination of the following conditions are met.

At step 82, a deceleration of the vehicle ($D_{vehicle}$) is compared to a deceleration calibratable threshold ($D_{CT}$). If the deceleration of the vehicle ($D_{vehicle}$) is greater than or equal to the deceleration calibratable threshold ($D_{CT}$) then the condition of step 82 is met.

At step 86, the controller 10 compares the engine speed ($S_{engine}$) to an acceptable range of operation. If the engine speed ($S_{engine}$) is unacceptable, then the condition of step 86 is met.

At step 90, the status of the engine retarder is checked. If the engine retarder has been disabled, then the condition of step 90 is met. In some embodiments, the engine retarder includes an exhaust throttle, a variable geometry turbocharger (VGT), a compression brake, etc.

At step 94, the engine retarder torque request ($T_{requested}$) is compared to the torque calibratable threshold ($T_{CT}$). If the engine retarder torque request ($T_{requested}$) is less than or equal to the torque calibratable threshold ($T_{CT}$) then the condition of step 94 is met.

At step 98, the vehicle speed ($S_{vehicle}$) is compared to the target speed set in step 46. If the vehicle speed ($S_{vehicle}$) is less than or equal to the target speed (e.g., with hysteresis) then the condition of step 98 is met.

At step 102, input from the look-ahead system is used to determine if the supplemental braking source is no longer needed. If the look-ahead system determines that supplemental engine braking will no longer be needed, then the condition of step 102 is met.

Steps 82-102 include exemplary disengagement conditions that can be used by the controller to stop (or alter the activity of) the engine accessory (e.g., the fan). In some embodiments, the disengagement condition includes only one of the steps 82-102. In some embodiments, the disengagement condition includes a combination of the steps 82-102. In some embodiments, different combinations of steps 82-102 being met may result in the disengagement condition being met. For example, if the look-ahead system determines a large uphill section upcoming at step 102, and the engine retarder is disabled at step 90, then the disengagement condition is met, even if the conditions of other steps are not met. In some embodiments, all the conditions of steps 82-102 must be met in order for the disengagement condition to be met.

At step 106, the supplemental braking source disengages and the fan speed request will drop to no longer request any FEAD load.

The fan 9 is operated to supplement engine braking power in accordance with noise goals (e.g., fan speed) and around the capacity (e.g., a slip heat region) of a fan clutch. The fan 9 is also controlled for efficiency and durability goals, utilizes an initial delay to reduce engagement of the supplemental engine braking system on short grades. In some embodiments, the system could use a timer and/or the look ahead technologies to determine when a grade is too short. Speed ratios of the fan can be limited to maximize spin down rates once disengaged to mitigate efficiency penalties.

No claim element herein is to be construed under the provisions of 35 U.S.C. § 112(f), unless the element is expressly recited using the phrase "means for."

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality may be used to accomplish the method shown in FIG. 1, it should be understood that the controller may include any number of circuits for completing the functions described herein. For example, the activities and functionalities of the circuits may be combined in multiple circuits or as a single circuit. Additional circuits with additional functionality may also be included. Further, the controller may further control other activity beyond the scope of the present disclosure.

As mentioned above and in one configuration, the "circuits" may be implemented in machine-readable medium for execution by various types of processors, such as a controller or a processor. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method of controlling a fan to supplement engine braking, comprising:

determining that an engagement condition for the fan exists;

requesting a fan speed;

interpreting an operating parameter of the fan;

determining a modified operating parameter for the fan based on a predefined limit, the modified operating parameter defining a fan speed that is less than the requested fan speed;

operating the fan according to the modified operating parameter; and ceasing operation of the fan according to the modified operating parameter when a disengagement condition for the fan exists.

2. The method of claim 1, wherein the modified operating parameter limits noise produced by the fan or increases fan durability over time.

3. The method of claim 1, wherein the modified operating parameter reduces a fan speed when a fan slip heat limit is met.

4. The method of claim 1, wherein the engagement condition includes an engine retarder being enabled for a threshold time.

5. The method of claim 1, wherein the engagement condition includes a look-ahead indication of a downhill grade.

6. The method of claim 1, wherein the engagement condition includes a vehicle acceleration greater than an acceleration calibratable threshold.

7. The method of claim 1, wherein the predefined limit includes at least one of a noise threshold or a fan durability requirement.

8. The method of claim 1, wherein the modified operating parameter ignores the predefined limit if a vehicle acceleration exceeds an acceleration threshold.

9. An apparatus that supplements engine braking, comprising:

a circuit structured to:

determine that an engagement condition for a fan exists;

determine a target vehicle speed;

receive a requested fan speed;

determine a modified operating parameter for the fan to bias a vehicle speed toward the target vehicle speed, the modified operating parameter defining a fan speed that is less than the requested fan speed;

operate the fan according to the modified operating parameter; and cease operation of the fan according to the modified operating parameter when a disengagement condition for the fan exists.

10. The apparatus of claim 9, wherein the modified operating parameter limits noise produced by the fan or increases fan durability over time.

11. The apparatus of claim 9, wherein the modified operating parameter reduces a fan speed when a fan slip heat limit is met.

12. The apparatus of claim 9, wherein the engagement condition includes at least one of an engine retarder being enabled for a threshold time, a look-ahead indication of a downhill grade, or a vehicle acceleration greater than an acceleration calibratable threshold.

13. The apparatus of claim 9, wherein the modified operating parameter is based at least in part on a predefined limit, and wherein the modified operating parameter ignores the predefined limit if a vehicle acceleration exceeds an acceleration threshold.

14. A system, comprising:

a fan; and a controller coupled to the fan, the controller structured to:

determine that an engine brake is engaged;

determine a target vehicle speed;

determine a requested fan speed to supplement the engine brake and bias a vehicle speed toward the target vehicle speed;

limit the requested fan speed to a modified fan speed based on a predefined noise limit, the modified fan speed being less than a maximum the requested fan speed thereby reducing the supplement to the engine brake;

deliver the modified fan speed to the fan; and cease operation of the fan according to the modified fan speed when a disengagement condition for the fan exists.

15. The system of claim 14, wherein the modified fan speed limits noise produced by the fan or increases fan durability over time.

16. The system of claim 14, wherein the modified fan speed reduces the initial fan speed when a fan slip heat limit is met.

17. The system of claim 14, wherein the controller is further structured to update the modified fan speed if a fan speed ratio exceeds a threshold.

18. The system of claim 14, wherein the modified fan speed is ignored operating parameter if a vehicle acceleration exceeds an acceleration threshold.

* * * * *